Patented June 3, 1930

1,762,020

UNITED STATES PATENT OFFICE

MYRTIL KAHN, OF COLOGNE, GERMANY, ASSIGNOR TO GENERAL ANILINE WORKS, INC., OF NEW YORK, N. Y., A CORPORATION OF DELAWARE

NEW AZO DYESTUFFS

No Drawing. Application filed September 10, 1927, Serial No. 218,860, and in Germany October 22, 1926.

The present invention concerns new azo dyestuffs. They are obtained by combining the tetrazo compounds of the intermediate bodies from a p-diamine and an amino-naphthol sulfonic acid with two molecules of a 1-hydroxy-alkylamino-3-amino-benzene or with one molecule of the same and any desired component, the sequence of the combination being immaterial.

In accordance with the invention azo dyestuffs possessing remarkably good dyeing properties coupled with good solubility are obtained. It is only necessary that one hydroxy alkyl group e. g. a hydroxy ethyl group be present in the whole dyestuff molecule, in order to produce the required solubility. The hydroxy alkyl compounds are easily prepared from the corresponding diamines an chloro substituted alcohols. Thus, for example, 1-hydroxy-ethylamino-3-aminobenzene,

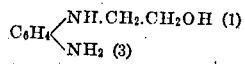

is readily obtained by warming together in aqueous solution, one molecule of m-phenylenediamine, one molecule of chloro ethyl alcohol and a quantity of sodium carbonate, sufficient to effect neutralization. The resulting solution can be used directly for the manufacture of the dyestuffs.

The new products are generally in the form of their alkali metal salts dark powders soluble in water and in concentrated sulfuric acid with a blue-black coloration dyeing cotton from blue to black shades, being split up by treatment with stannous chloride and hydrochloric acid into a para-diamine, a diaminonaphthol sulfonic acid and an oxy alkyl triaminobenzene. They have most probably the formula

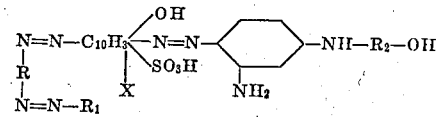

wherein R represents an aryl radicle, $R_1$ an azodyestuff component, X hydrogen or a sulfonic group, $R_2$ stands for one of the substituents $CH_2.CH_2$ and $CH_2.CH(OH).CH_2$, being in the form of their alkali metal salts dark powders soluble in water and in concentrated sulfuric acid with a blue-black coloration.

The following example will illustrate my invention:—

*Example.*—25.94 parts by weight of p-phenylene-diamine-azo-2-amino-8-naphthol-6-sulfonic acid are dissolved in known manner in alkali and cooled, treated with hydrochloric acid until an acid reaction with Congo paper is obtained and then converted into the tetrazo compound by the addition of a solution of 10 parts by weight of sodium nitrite. 11 parts by weight of a 1-hydroxy-ethyl-amino-3-aminobenzene, obtained as above indicated are caused to combine with the tetrazo compound, the whole being neutralized by the gradual addition of sodium carbonate solution until a test portion on paper proves the disappearance of the tetrazo compound and the diamine. Thereupon a solution of 8 parts by weight of m-phenylene diamine and excess of sodium carbonate are added. After stirring for several hours the resulting product is filtered and dried. The new dyestuff dyes vegetable fibres in deep black shades. It has most probably the following formula:—

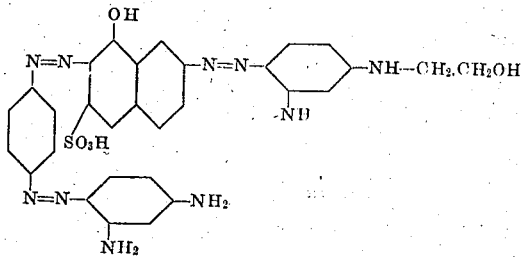

and is a dark powder soluble in water and in concentrated sulfuric acid with a blue-black coloration yielding upon reduction with stannous chloride and hydrochloric acid para-phenylenediamine, 1.3.4.-triaminobenzene, 1-hydroxy-ethylamino-3.4-diaminobenzene and 2.7-diamino-8-naphthol-6-sulfonic acid.

Other p-diamines such for example as benzidine, p-diamino diphenylamine and the like may be used instead of p-phenylene diamines; instead of 2-amino-8-naphthol-6-sulphonic acid other aminonaphthol sulphonic acids may be used, such for example as 2.5-aminonaphthol-7-sulphonic acid and the like; instead of hydroxy ethyl m-phenylenediamine other similar diamines may be used, such for example as 1-methyl-2-hydroxy-ethylamino-4-amino-benzene of the formula:

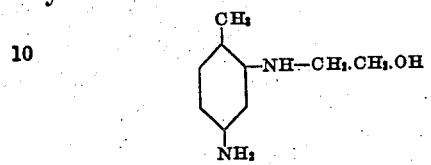

glyceryl-m-phenylene-diamine of the following formula:

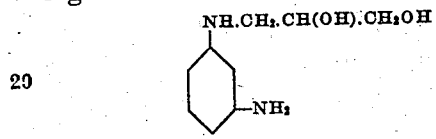

(obtained from m-phenylene diamine and epichlorhydrin) and the like.

I claim:—

1. The process for the production of new azo dyestuffs comprising coupling the tetrazo compound of the intermediate bodies from a p-diamine and an amino naphthol sulfonic acid with two molecules of components at least one of them being a 1-hydroxy-alkyl-amino-3-aminobenzene, the sequence of the combination being immaterial.

2. As new products the azodyestuffs having most probably the formula

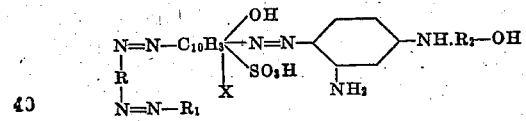

wherein R represents an aryl radicle, $R_1$ an azodyestuff component, X hydrogen or a sulfonic group, $R_2$ one of the substituents $CH_2.CH_2$ and $CH_2.CH(OH).CH_2$, being in the form of their alkali metal salts, dark powders soluble in water and in concentrated sulfuric acid with a blue-black coloration, dyeing cotton from blue to black shades, being split up by treatment with stannous chloride and hydrochloric acid into a para-diamine, a diaminonaphthol sulfonic acid and an hydroxy alkyl triaminobenzene.

3. As a new product the dye having the formula

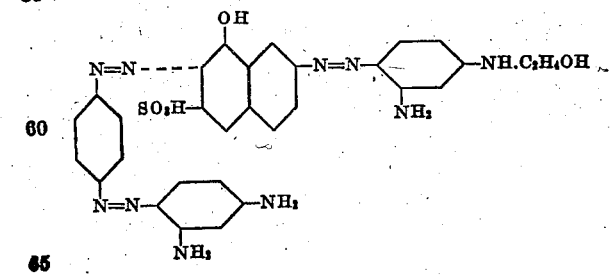

and being a dark powder soluble in water and in concentrated sulfuric acid with a blue-black coloration, yielding upon reduction with stannous chloride and hydrochloric acid para-phenylenediamine, 1.2.4 - triaminobenzene 2.7-diamino-8-naphthol-6-sulfonic acid and 1-oxyethyl-amino-3.4-diaminobenzene.

In testimony whereof I have hereunto set my hand.

MYRTIL KAHN.